(12) United States Patent
Parker

(10) Patent No.: US 10,062,190 B1
(45) Date of Patent: Aug. 28, 2018

(54) ANALYTIC SYSTEM FOR GRAPHICAL INTERACTIVE BASIS FUNCTION SELECTION

(71) Applicant: SAS Institute Inc., Cary, NC (US)

(72) Inventor: Ryan Jeremy Parker, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/978,568

(22) Filed: May 14, 2018

Related U.S. Application Data

(63) Continuation-in-part of application No. 15/890,841, filed on Feb. 7, 2018, now Pat. No. 9,996,952.

(60) Provisional application No. 62/544,872, filed on Aug. 13, 2017.

(51) Int. Cl.
*G06T 11/20* (2006.01)

(52) U.S. Cl.
CPC .......... *G06T 11/206* (2013.01); *G06T 11/203* (2013.01); *G06T 2200/24* (2013.01)

(58) Field of Classification Search
CPC .. G06T 11/203; G06T 11/206; G06T 2200/24
See application file for complete search history.

(56) References Cited

U.S. PATENT DOCUMENTS

| 2010/0177103 A1* | 7/2010 | Grandine | G06F 17/50 345/442 |
|---|---|---|---|
| 2013/0030886 A1* | 1/2013 | Poortinga | G06Q 30/0201 705/14.4 |
| 2014/0139529 A1* | 5/2014 | Mukai | G06F 17/17 345/442 |

OTHER PUBLICATIONS

Movahedian et al., A Trefftz method in space and time using exponential basis functions: Application to direct and inverse heat conduction problems, Engineering Analysis with Boundary Elements 37, Apr. 22, 2013, pp. 868-883.

(Continued)

*Primary Examiner* — Michelle L Sams
(74) *Attorney, Agent, or Firm* — Bell & Manning, LLC

(57) ABSTRACT

Graphical interactive basis function selection is provided. A presented criterion fit graph includes a curve for each parameter value of predefined parameter values. Each curve shows a fit criterion value as a function of a number of locations values. A best fit graph is presented next to the presented criterion fit graph. The best fit graph includes location lines, wherein a location line is defined at each location defined for a determined best fit basis function, and a best fit function curve that is a plot of a response variable value computed as a function of an explanatory variable value using the best fit basis function. A first location line of the location lines is moved to a different location value. Computations are repeated replacing the location value associated with the first location line with the different location value to update the criterion fit graph and the best fit graph.

30 Claims, 14 Drawing Sheets

(56) References Cited

OTHER PUBLICATIONS

Konidaris et al., Value Function Approximation in Reinforcement Learning Using the Fourier Basis, Proceedings of the Twenty-Fifth AAAI Conference on Artificial Intelligence, Aug. 2011, pp. 380-385.
Eilers et al., Flexible Smoothing with B-splines and Penalties, Statistical Science, vol. 11, No. 2, (1996) pp. 89-121.
SAS Institute Inc. 2011. SAS/STAT® 9.3 User's Guide. Cary, NC: SAS Institute Inc., Jul. 2011.
A. Graps, An Introduction to Wavelets, IEEE Computational Science & Engineering, (1995) pp. 50-61.

* cited by examiner

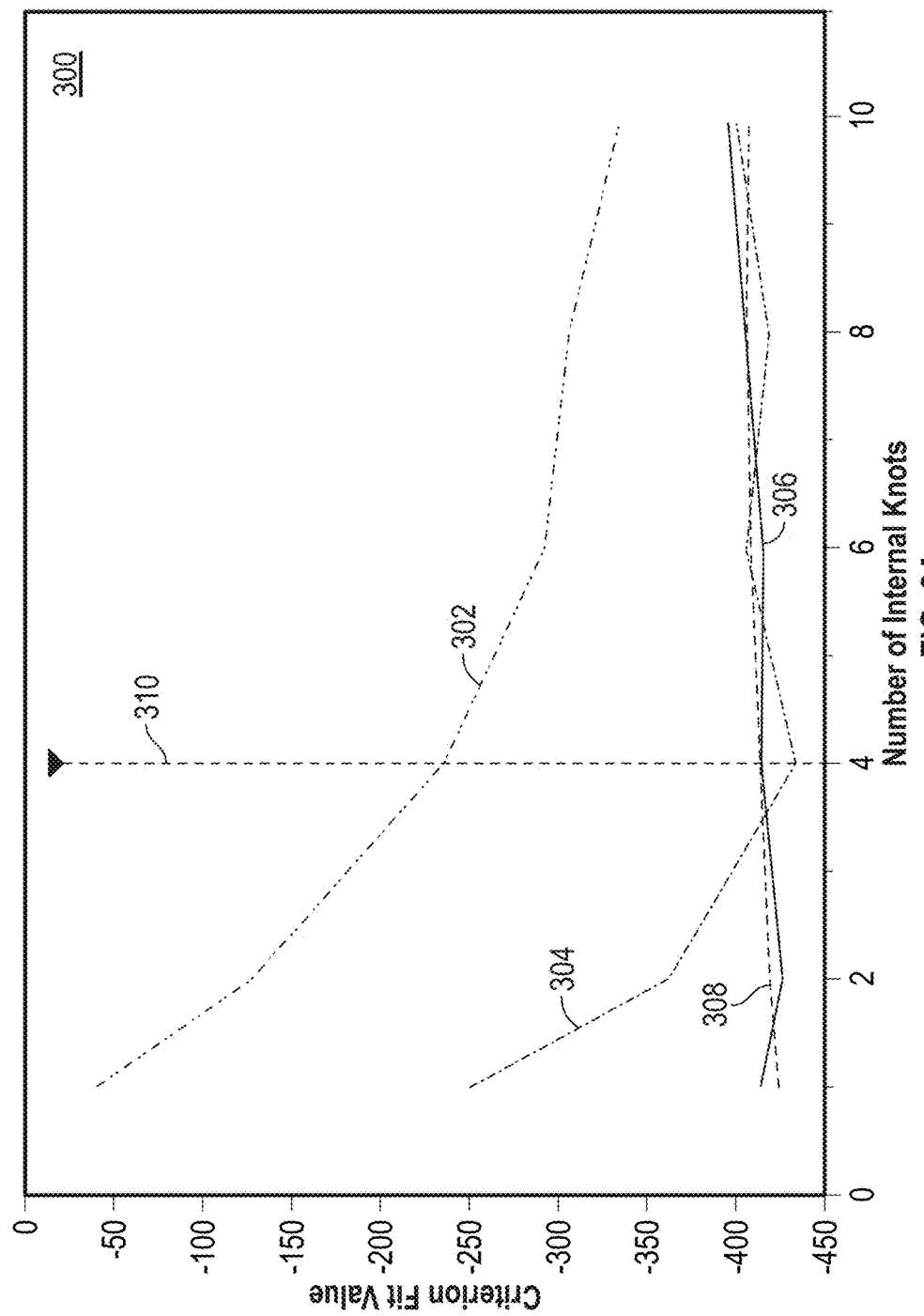

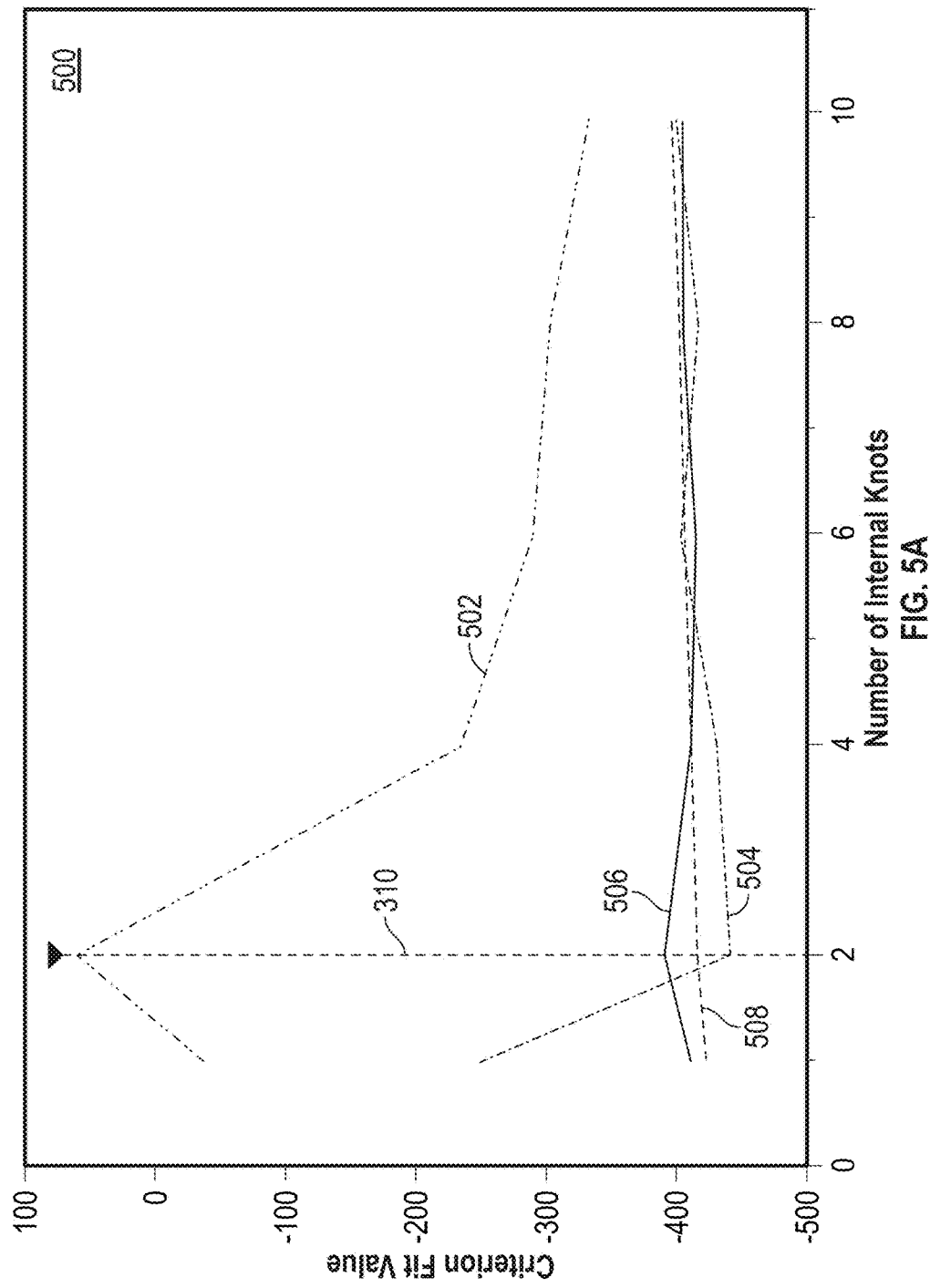

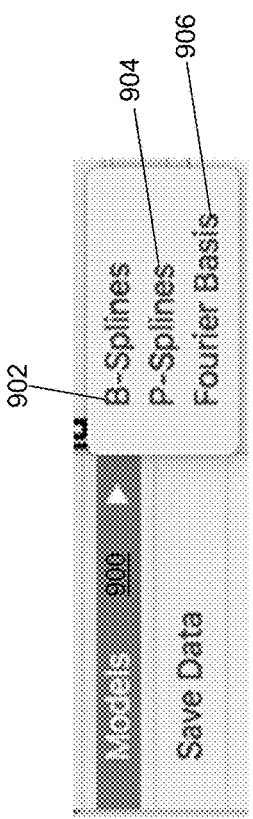

ANALYTIC SYSTEM FOR GRAPHICAL INTERACTIVE BASIS FUNCTION SELECTION

CROSS-REFERENCE TO RELATED APPLICATIONS

The present application claims the benefit of 35 U.S.C. § 111(e) to U.S. Provisional Patent Application No. 62/544,872 filed on Aug. 13, 2017, the entire contents of which are hereby incorporated by reference. The present application is also a continuation-in-part of U.S. patent application Ser. No. 15/890,841 that was filed Feb. 7, 2018, the entire contents of which are hereby incorporated by reference.

BACKGROUND

Basis functions, such as b-splines, p-splines, and Fourier basis functions, are a common tool for modeling non-linear data. There are three parameters that are chosen to fit basis functions: (1) a number of knots/pairs or of Fourier pairs, (2) a location of each knot or of each Fourier pair, and (3) a degree/period of a polynomial or of a sin/cos function period used to fit the data. Iteratively selecting combinations of these parameters requires significant computer resources particularly given that the number of locations that can be evaluated for each knot/Fourier pair can be large.

SUMMARY

In an example embodiment, a non-transitory computer-readable medium is provided having stored thereon computer-readable instructions that, when executed by a computing device, cause the computing device to provide interactive basis function selection. A dataset is read that includes a plurality of observation vectors. Each observation vector of the plurality of observation vectors includes an explanatory variable value of an explanatory variable and a response variable value of a response variable. A first location value and a last location value are defined. (a) a number of locations value is selected from a predefined plurality of number of locations values. (b) A location value for each integer value is defined between one and the selected number of locations value. The location value is defined based on each explanatory variable value of the explanatory variable read from the dataset. (c) a parameter value is selected from a predefined plurality of parameter values. (d) a basis function is fit using the defined first location value, each defined location value, the defined last location value, and the selected parameter value. The basis function is fit to the explanatory variable value and the response variable value of each observation vector of the plurality of observation vectors to define coefficients that describe the response variable based on the explanatory variable. (e) a fit criterion value for the fit basis function is computed that quantifies a goodness of the fit. (f) the computed fit criterion value, each defined location value, the selected parameter value, and the defined coefficients are stored to the computer-readable medium. (g) (c) to (f) is repeated with each remaining parameter value of the predefined plurality of parameter values as the selected parameter value. (h) (a) to (g) is repeated with each remaining number of locations value of the predefined plurality of number of locations values as the selected number of locations value. (i) a best fit basis function is determined based on the stored, computed fit criterion value of each fit basis function. (j) a criterion fit graph is presented on a display. The criterion fit graph includes a curve for each parameter value of the predefined plurality of parameter values. Each curve shows the stored, computed fit criterion value as a function of the predefined plurality of number of locations values. (k) a best fit graph is presented on the display next to the presented criterion fit graph. The best fit graph includes a plurality of location lines, wherein a location line is defined at each location defined in (b) for the determined best fit basis function, and a best fit function curve that is a plot of the response variable value computed as a function of the explanatory variable value using the defined coefficients of the determined best fit basis function. An indicator is received that a first location line of the plurality of location lines is moved to a different location value. (a) to (k) is repeated replacing the location value associated with the first location line with the different location value to update the presented criterion fit graph and the presented best fit graph.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide interactive basis function selection.

In yet another example embodiment, a method of interactive basis function selection is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 3A and 3B, 4A and 4B, 5A and 5B, 8, 9, and 10 show a user interface supported by the basis function selection application of FIGS. 2A, 2B, and 2C and used to interactively select a basis function in accordance with an illustrative embodiment.

DETAILED DESCRIPTION

Figure 1:
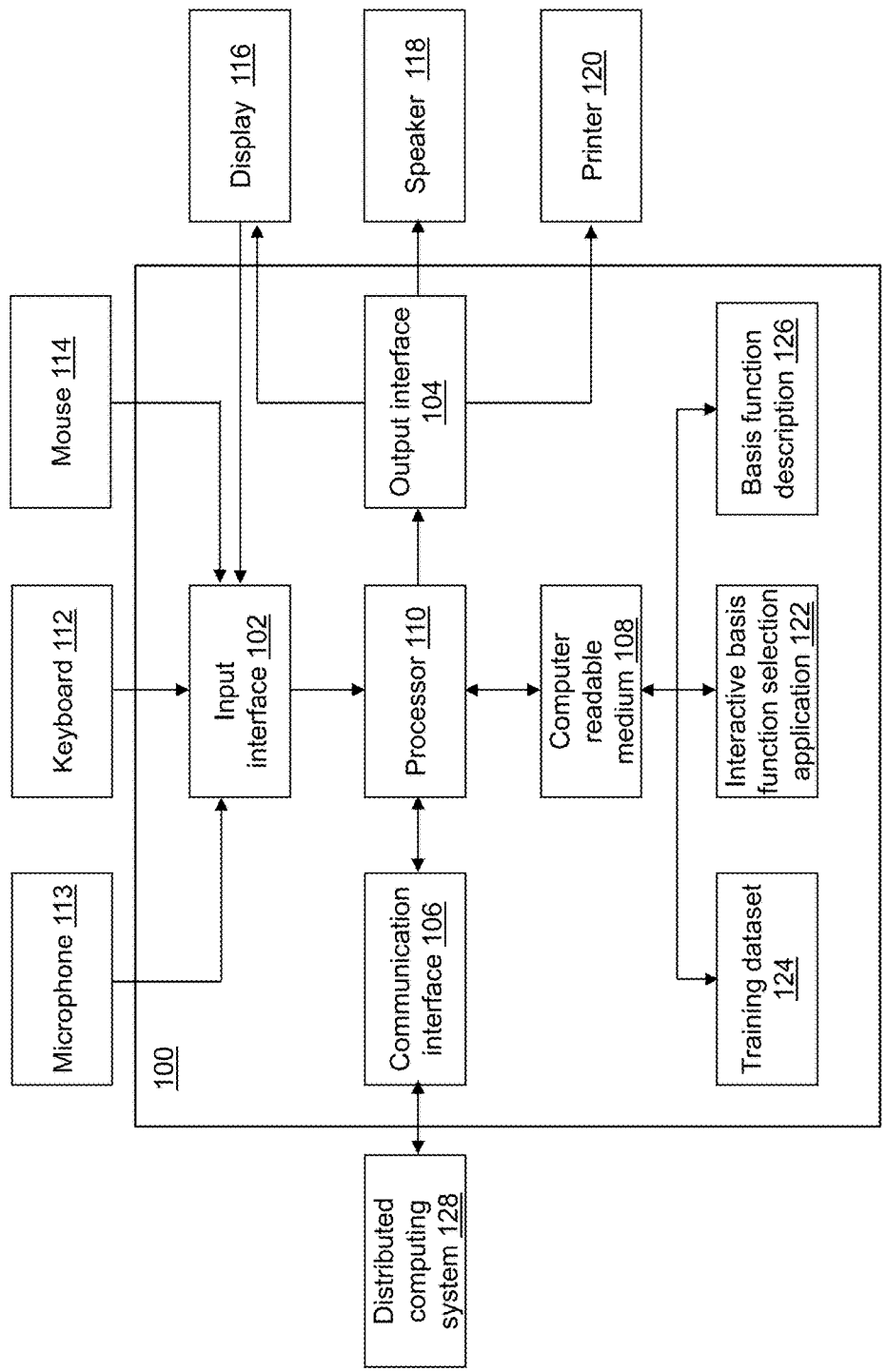
FIG. 1 depicts a block diagram of a basis function selection device in accordance with an illustrative embodiment.

Referring to FIG. 1, a block diagram of a basis function selection device 100 is shown in accordance with an illustrative embodiment. Basis function selection device 100 provides interactive basis function selection. Basis function selection device 100 may include an input interface 102, an output interface 104, a communication interface 106, a non-transitory computer-readable medium 108, a processor 110, an interactive basis function selection application 122, a training dataset 124, and a basis function description 126.

Fewer, different, and/or additional components may be incorporated into basis function selection device 100.

Input interface 102 provides an interface for receiving information from the user or another device for entry into basis function selection device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into basis function selection device 100 or to make selections presented in a user interface displayed on display 116.

The same interface may support both input interface 102 and output interface 104. For example, display 116 comprising a touch screen provides a mechanism for user input and for presentation of output to the user. Basis function selection device 100 may have one or more input interfaces that use the same or a different input interface technology. The input interface technology further may be accessible by basis function selection device 100 through communication interface 106.

Output interface 104 provides an interface for outputting information for review by a user of basis function selection device 100 and/or for use by another application or device. For example, output interface 104 may interface with various output technologies including, but not limited to, display 116, a speaker 118, a printer 120, etc. Basis function selection device 100 may have one or more output interfaces that use the same or a different output interface technology. The output interface technology further may be accessible by basis function selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Basis function selection device 100 may have one or more communication interfaces that use the same or a different communication interface technology. For example, basis function selection device 100 may support communication using an Ethernet port, a Bluetooth antenna, a telephone jack, a USB port, etc. Data and messages may be transferred between basis function selection device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. basis function selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Basis function selection device 100 also may have one or more drives that support the loading of a memory media such as a CD, DVD, an external hard drive, etc. One or more external hard drives further may be connected to basis function selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Basis function selection device 100 may include a plurality of processors that use the same or a different processing technology.

Interactive basis function selection application 122 performs operations associated with defining basis function description 126 from data stored in training dataset 124 and with allowing the user of basis function selection device 100 to interactively select the basis function input parameters. Basis function description 126 may be used to predict a response variable value for data stored in an input dataset 624 (shown referring to FIG. 6). Some or all of the operations described herein may be embodied in interactive basis function selection application 122. The operations may be implemented using hardware, firmware, software, or any combination of these methods.

Interactive basis function selection application 122 is easy to use and provides approximately instantaneous feedback so that the user can quickly and efficiently change a location of one or more knots/pairs interactively. Alternative solutions require the user to specify the exact locations of all knots/pairs, while interactive basis function selection application 122 allows the user to easily change all or any subset of the default locations as needed.

Referring to the example embodiment of FIG. 1, interactive basis function selection application 122 is implemented in software (comprised of computer-readable and/or computer-executable instructions) stored in computer-readable medium 108 and accessible by processor 110 for execution of the instructions that embody the operations of interactive basis function selection application 122. Interactive basis function selection application 122 may be written using one or more programming languages, assembly languages, scripting languages, etc. Interactive basis function selection application 122 may be integrated with other analytic tools. As an example, interactive basis function selection application 122 may be part of an integrated data analytics software application and/or software architecture such as that offered by SAS Institute Inc. of Cary, N.C., USA. Merely for illustration, interactive basis function selection application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Interactive basis function selection application 122 may be implemented as a Web application. For example, interactive basis function selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables may include a response variable Y and one or more explanatory variables that define an explanatory vector X for each observation vector. Training dataset 124 may include additional variables that are not the response variable Y or one of the explanatory variables. An observation vector is defined as $(y_i, x_i)$ that may include a value for each of the response variable Y and the explanatory variables associated with the observation vector i. One or more variables of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in training dataset 124 for analysis and processing.

Training dataset 124 may be stored on computer-readable medium 108 or on one or more computer-readable media of distributed computing system 128 and accessed by basis function selection device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observation vectors per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on basis function selection device 100 or on distributed computing system 128. basis function selection device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. SAS® Cloud Analytic Services (CAS) may be used as an analytic server with associated cloud services in SAS® Viya™ Some systems may use SAS In-Memory Statistics for Hadoop® to read big data once and analyze it several times by persisting it in-memory for the entire session. Some systems may be of other types and configurations.

A basis function models a behavior of Y given an explanatory variable X. For illustration, a basis function can be computed using the TRANSREG, PRINQUAL, and GLIMMAX procedures implemented by SAS/STAT software, using the adaptivereg action implemented by SAS Viya software, or the BSPLINE function of SAS/IML® software.

Figure 2A:
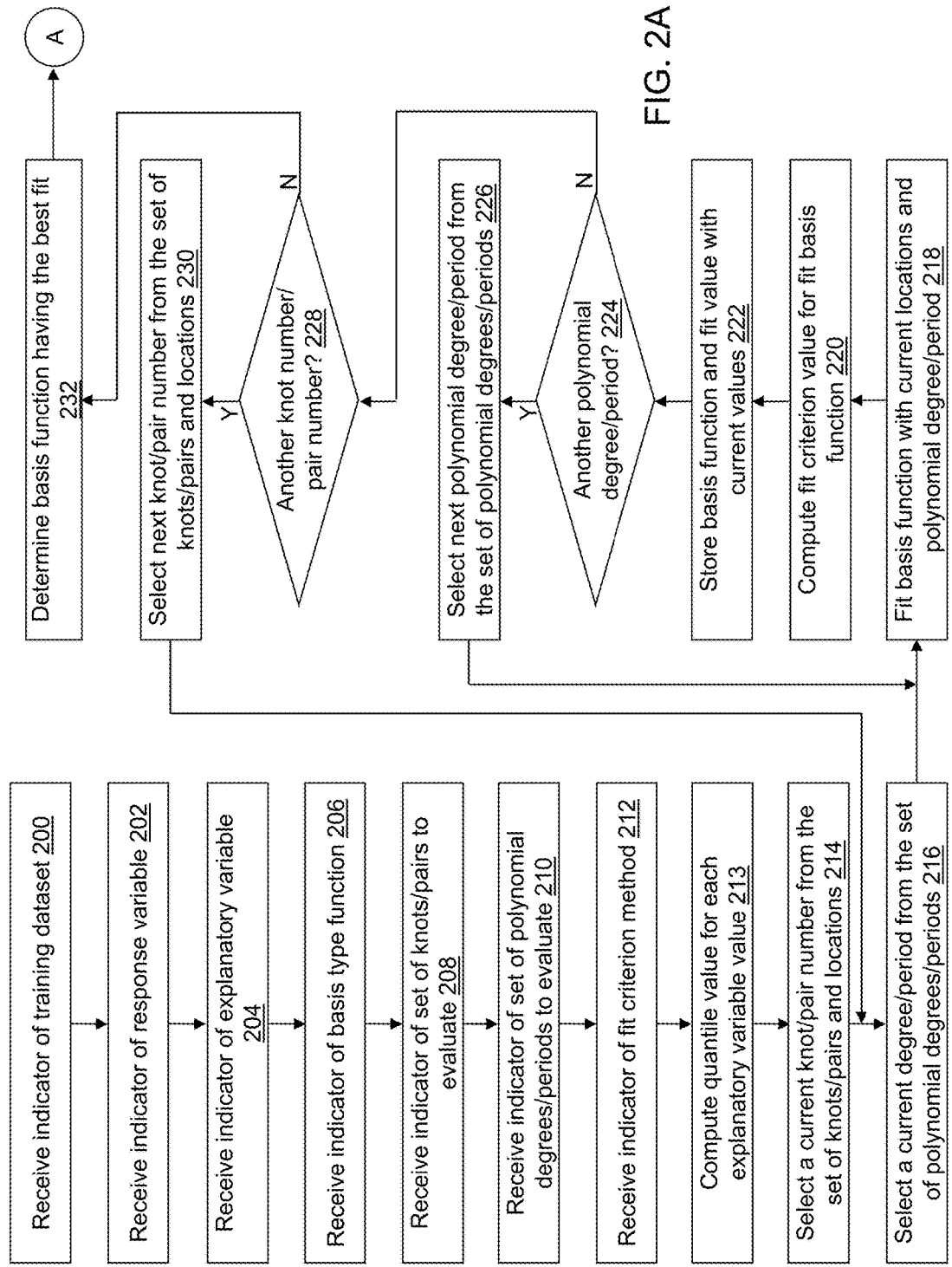
FIGS. 2A, 2B, and 2C depict a flow diagram illustrating examples of operations performed by a basis function selection application of the basis function selection device of FIG. 1 in accordance with an illustrative embodiment.
Figure 2B:
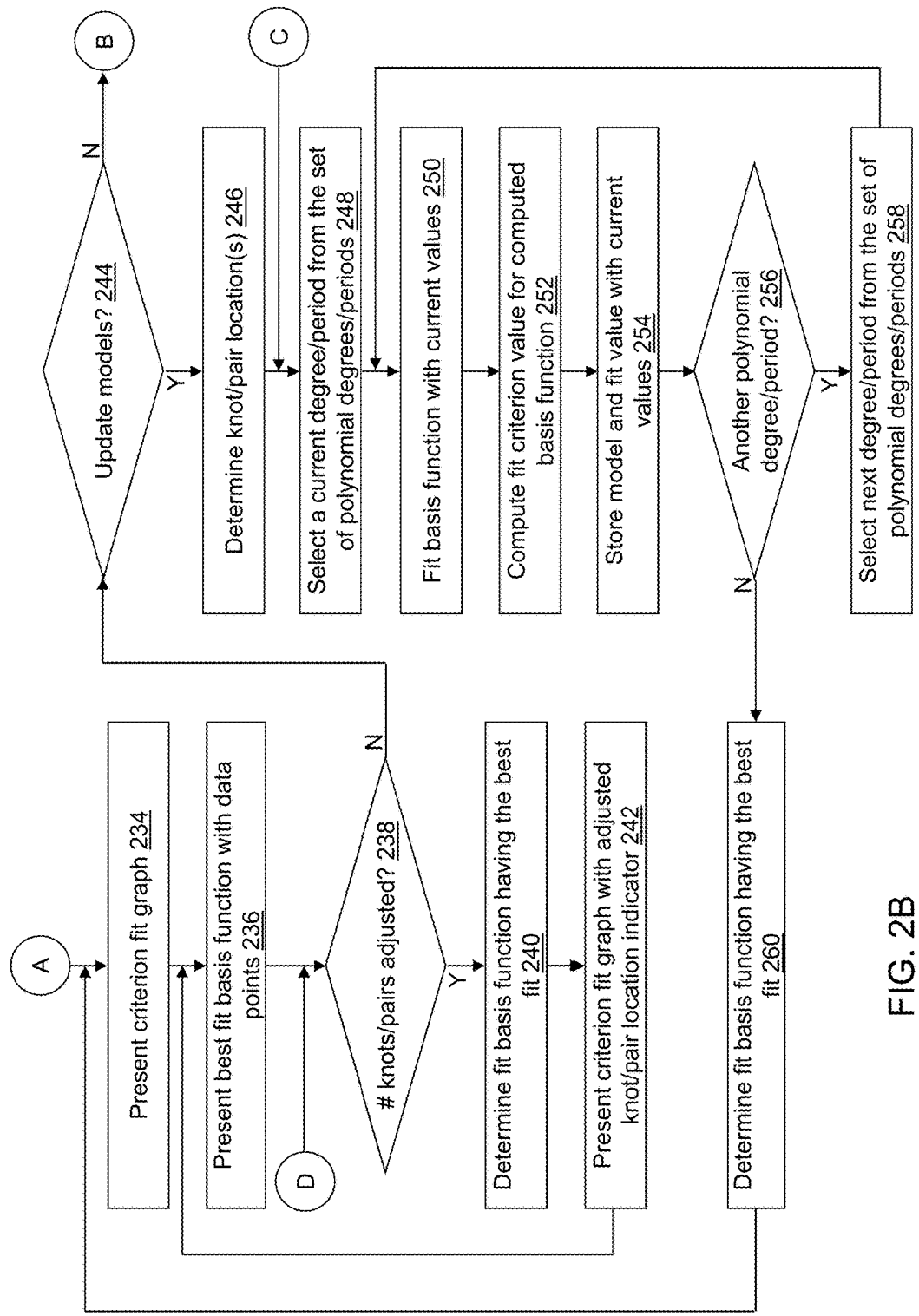
Figure 2C:
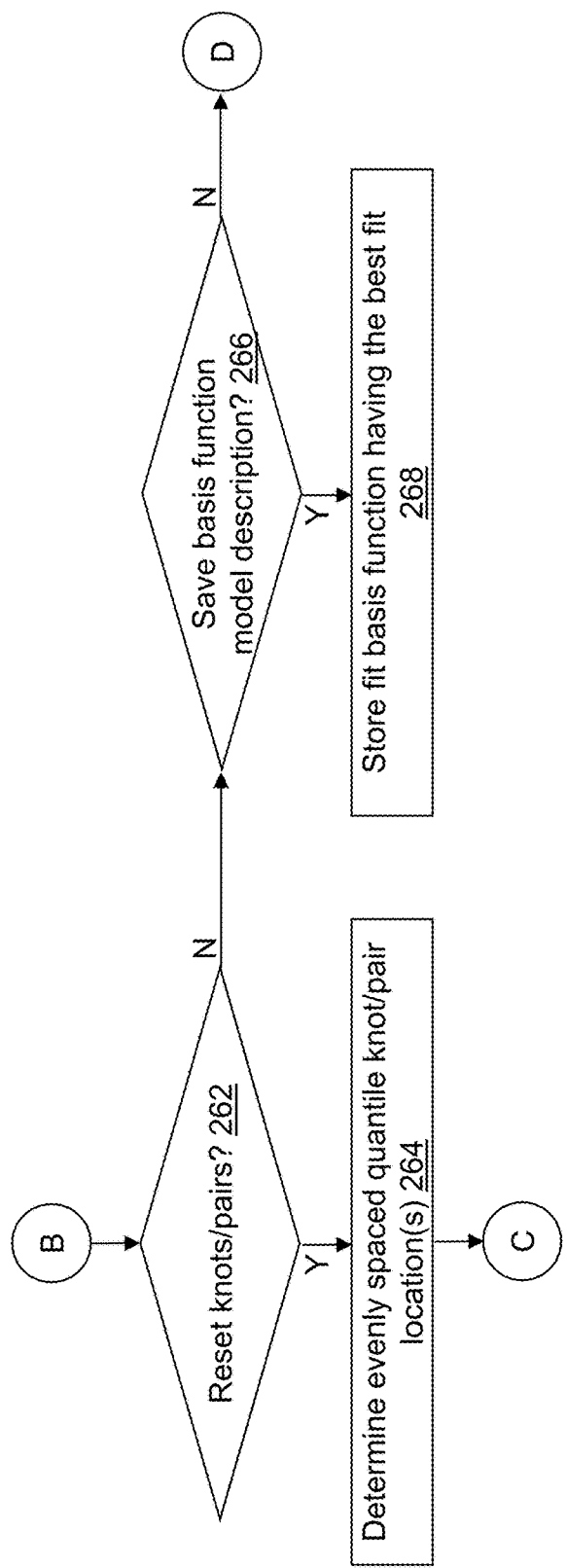

Referring to FIGS. 2A, 2B, and 2C, example operations associated with interactive basis function selection application 122 are described. Additional, fewer, or different operations may be performed depending on the embodiment of interactive basis function selection application 122. The order of presentation of the operations of FIGS. 2A, 2B, and 2C is not intended to be limiting. Some of the operations may not be performed in some embodiments. Although some of the operational flows are presented in sequence, the various operations may be performed in various repetitions, concurrently (in parallel, for example, using threads and/or a distributed computing system), and/or in other orders than those that are illustrated. For example, a user may execute interactive basis function selection application 122, which causes presentation of a first user interface window, which may include a plurality of menus and selectors such as drop-down menus, buttons, text boxes, hyperlinks, etc. associated with interactive basis function selection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by interactive basis function selection application 122.

Referring to FIG. 2A, in an operation 200, a first indicator may be received that indicates training dataset 124. For example, the first indicator indicates a location and a name of training dataset 124. As an example, the first indicator may be received by interactive basis function selection application 122 after selection from a user interface window or after entry by a user into a user interface window. In an alternative embodiment, training dataset 124 may not be selectable. For example, a most recently created dataset may be used automatically.

In an operation 202, a second indicator may be received that indicates response variable Y in training dataset 124. For example, the second indicator may indicate a column number or a column name. As another option, a first or a last column of training dataset 124 may be assumed to be the response variable Y column.

In an operation 204, a third indicator may be received that indicates an explanatory variable X in training dataset 124. For example, the third indicator may indicate a column number or a column name. As another option, a first or a last column of training dataset 124 may be assumed to be the explanatory variable X column.

Figure 10:
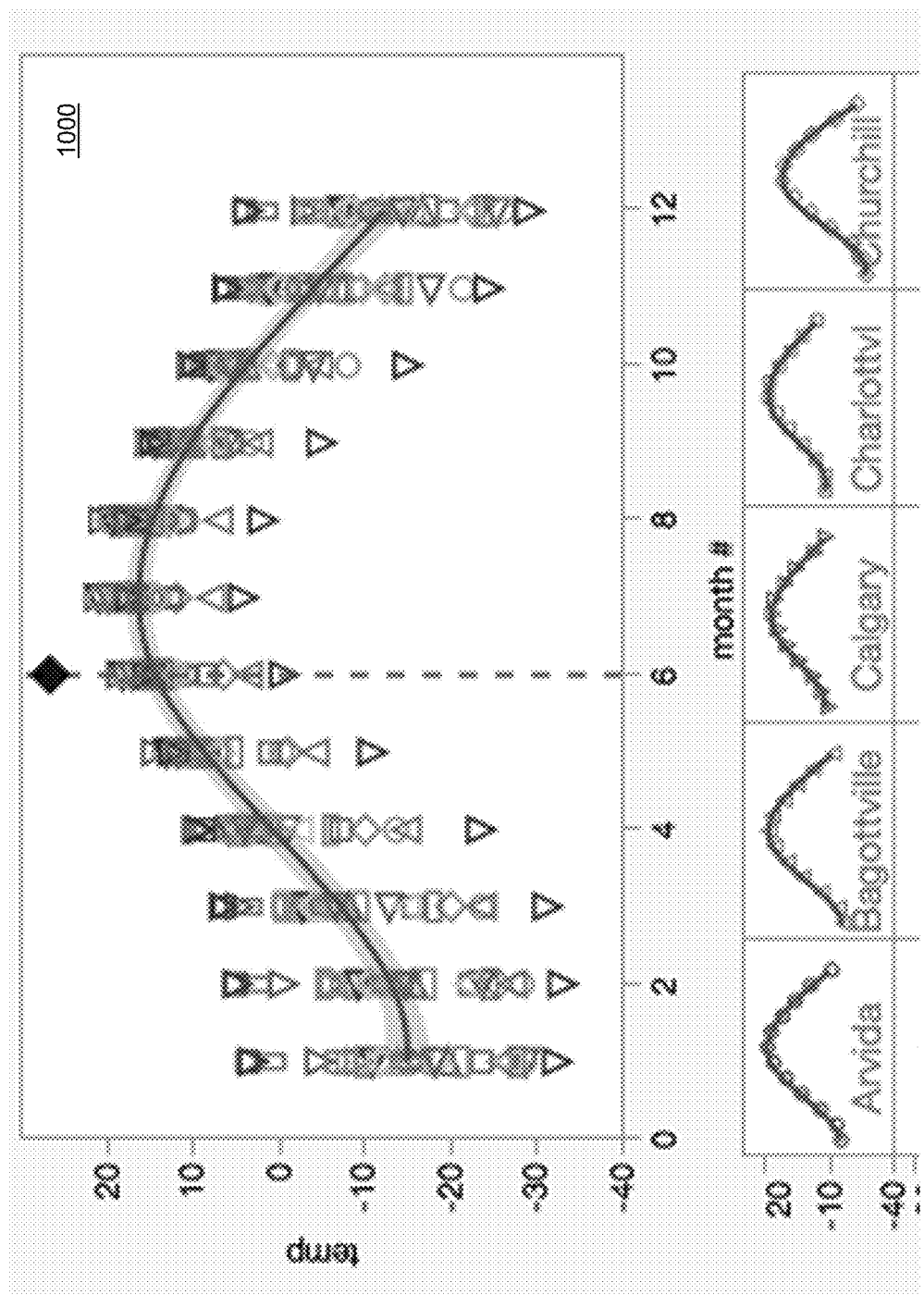

For illustration, referring to FIG. 8, an input window 800 can be used to select response variable Y using y-value selector 802 to define the second indicator as having the column name "Ethanol" and to select explanatory variable X using x-value selector 804 to define the third indicator as having the column name "Time". Input window 800 may further include an ID selector 806 and a validation selector 808. ID selector 806 can be used to identify if there is more than one function in training dataset 124. For illustration, referring to FIG. 10, multi-function graph 1000 shows a plurality of curves with each curve representing an average temperature for each month for a different city. Validation selector 808 can be used to identify if training dataset 124 is a part of a training data set ("Training") used in the model fit, or if it is used for validating the model ("Validation").

In an operation 206, a fourth indicator may be received that indicates a basis function. For example, the fourth indicator indicates a name of a type of basis function. The fourth indicator may be received by interactive basis function selection application 122 after selection from a user interface window or after entry by a user into a user interface window. A default value for the type of basis function may further be stored, for example, in computer-readable medium 108. As an example, a type of basis function may be selected from "B-Splines", "P-Splines", "Fourier Basis", "Wavelets", "Power Basis", "Exponential Basis", etc. For example, a default type of basis function may be indicated by "B-Splines", which indicates a basis spline function. For illustration, "P-Splines" indicates a penalized basis spline function, "Fourier Basis" indicates a Fourier basis function, "Wavelets" indicates a wavelet basis function, "Power Basis" indicates a power basis function that raises the input to a power over a grid of powers, and "Exponential Basis" indicates an exponential basis function. Of course, the type of basis function may be labeled or selected in a variety of different manners by the user as understood by a person of skill in the art. In an alternative embodiment, the type of basis function may not be selectable, and a single type of basis function is implemented by interactive basis function selection application 122. For example, the type of basis function indicated as "B-Spline" may be used by default or without allowing a selection.

For illustration, referring to FIG. 9, a basis function selector 900 can be used to define the fourth indicator using a first function name selector 902 to select the "B-Splines"

type of basis function, a second function name selector 904 to select the "P-Splines" type of basis function, and a third function name selector 906 to select the "Fourier Basis" type of basis function. For example, the TRANSREG procedure, the GLMSELECT procedure, or the GLIMMIX procedure implemented by SAS/State 9.3 software or the BSPLINE Function implemented by SAS/IML® 13.2 software can be used to compute the "B-Splines", the "P-Splines", and the "Power Basis" types of basis functions as described in SAS/State 9.3 User's Guide, SAS Institute Inc., Cary, N.C. (2011) or in SAS/IML® 13.2 User's Guide, SAS Institute Inc., Cary, N.C. (2014). For example, the paper by Amara Graps titled *An Introduction to Wavelets* published in the IEEE Computational Science & Engineering Journal in 1995 describes implementation of an illustrative "Wavelets" type of basis function. For example, the paper by Movahedian, B. et al. titled *A Trefftz method in space and time using exponential basis functions: Application to direct and inverse heat conduction problems* published in the Engineering Analysis with Boundary Elements Journal Volume 37 at pages 868 to 883 in 2013 describes implementation of an illustrative "Exponential Basis" type of basis function. For example, the paper by George Konidaris et al. titled *Value Function Approximation in Reinforcement Learning Using the Fourier Basis* published in the Proceedings of the Twenty-Fifth AAAI Conference on Artificial Intelligence at pages 380 to 385 in 2011 describes implementation of an illustrative "Fourier Basis" type of basis function. For example, the paper by Paul H. C. Eilers and Brian D. Marx titled *Flexible Smoothing with B-splines and Penalties* published in Statistical Science Volume 11, No. 2 at pages 89 to 121 in 1996 describes implementation of an illustrative "P-Splines Basis" type of basis function. For example, the paper by Paul H. C. Eilers and Brian D. Marx titled *Flexible Smoothing with B-splines and Penalties* published in Statistical Science Volume 11, No. 2 at pages 89 to 121 in 1996 describes implementation of an illustrative "P-Splines Basis" type of basis function.

In an operation 208, a fifth indicator of a set of a number of internal knots/pairs to evaluate using the basis function may be received. For example, a minimum number of internal knots/pairs, a maximum number of internal knots/pairs, and a number of internal knots/pairs increment may be selected or defined by a user. The number of internal knots may be indicated when the type of basis function is a b-spline or a p-spline. The number of internal pairs may be indicated when the type of basis function is a Fourier basis type to define a number of Fourier sine/cosine pairs. As another option, a user entered list of the number of knots/pairs to evaluate is received. In an alternative embodiment, the fifth indicator may not be received. For example, default values for the set of knots/pairs may be stored, for example, in computer-readable medium 108 and used automatically. For illustration, the set of knots/pairs to evaluate may include $N_{IK}=\{1, 2, 3, \ldots, 10\}$ number of internal knots/pairs that is used by default unless the user selects a different set of values for $N_{IK}$. An "exterior" knot is at an end point, primarily to handle the differences between polynomial degree/periods equal to 0, 1, 2, 3, etc. It is common to select these end points over the range of training dataset 124. This means there are $N_{EK}=D+1$ number of external knots/pairs where D is a polynomial degree/period at the location corresponding to a minimum and to a maximum over the range of training dataset 124. For example, $N_{EK}=4$, for a cubic (D=3) polynomial degree/period. The total number of knots/pairs is then $N_{TK}=2N_{EK} N_{IK}$. The set of knots/pairs includes only the internal knots/pairs. The set of knots/pairs need not be in numerical order. As additional examples, a number of power parameters or center parameters may be indicated when the type of basis function is a wavelets basis type, a number of grids may be indicated when the type of basis function is an exponential basis type, and a number of powers may be indicated when the type of basis function is a power type of basis function.

In an operation 210, a sixth indicator of a set of polynomial degree/periods to evaluate or a set of Fourier series periods to evaluate using the basis function may be received. For example, a minimum polynomial degree/period and a maximum polynomial degree/period may be selected or defined by a user. The number of polynomial degree/periods may be indicated when the type of basis function is a spline type. The number of Fourier series periods may be indicated when the type of basis function is a Fourier basis type. In an alternative embodiment, the sixth indicator may not be received. For example, default values for the set of polynomial degree/periods may be stored, for example, in computer-readable medium 108 and used automatically. For illustration, the set of polynomial degree/periods to evaluate may include $N_D=\{0, 1, 2, 3\}$ that is used by default when the type of basis function is a spline type unless the user selects a different set of values for $N_D$. For illustration, the set of polynomial degree/periods to evaluate may include $N_D=\{6, 12, 18, 24\}$ that is used by default the type of basis function is a Fourier basis unless the user selects a different set of values for $N_D$. The set of polynomial degree/periods need not be in numerical order. As additional examples, a set of mother wavelets may be indicated when the type of basis function is a wavelets basis type, a set of rate values for each grid may be indicated when the type of basis function is an exponential basis type, and a set of values for each power/center may be indicated when the type of basis function is a power type of basis function.

In an operation 212, a seventh indicator may be received that indicates a fit criterion method to use to estimate a quality of or a goodness of a fit of each basis function to paired values of the explanatory variable X and the response variable Y read from training dataset 124. For example, the seventh indicator indicates a name of a fit criterion method. The seventh indicator may be received by interactive basis function selection application 122 after selection from a user interface window or after entry by a user into a user interface window. A default value for the fit criterion method may further be stored, for example, in computer-readable medium 108. As an example, a fit criterion method may be selected from "BIC", "AIC", "GCV", "Robust GCV", "AICc", etc. For example, a default fit criterion method may be indicated by "BIC", which indicates a Bayesian information criterion method, by "AIC", which indicates an Akaike (AIC) information criterion method, by "GCV", which indicates a generalized cross-validation (GCV) information criterion method, by "Robust GCV", which indicates a robust GCV information criterion method, by "AICc", which indicates a corrected AIC information criterion method, etc. Of course, the fit criterion method may be labeled or selected in a variety of different manners by the user as understood by a person of skill in the art. In an alternative embodiment, the fit criterion method may not be selectable, and a single fit criterion method is implemented by interactive basis function selection application 122. For example, the fit criterion method indicated as "BIC" may be used by default or without allowing a selection.

In an operation 213, a quantile value is computed for each explanatory variable value read from input dataset 124. For example, the RANK procedure implemented by Base SAS software can be used to compute the quantile values. For example, by specifying a GROUPS=100 option, percentile rank values can be computed for each explanatory variable value read from input dataset 124. In an alternative embodiment, the quantile value may not be computed. For example, when the "Fourier Basis" type of basis function is selected, operation 213 is not performed. Instead, a number of unique values of the explanatory variable X in training dataset 124 is determined and used instead of the quantile value.

In an operation 214, a current number of knots/pairs $N_{CK}$ is selected from the set of knots/pairs $N_{IK}$. Again, the current number of knots/pairs $N_{CK}$ is a number of internal knots. For example, a first number of knots/pairs is selected from the set of knots/pairs $N_{IK}$. For example, the internal knot locations are chosen by selecting knots located at evenly spaced quantiles of the explanatory variable values read from training dataset 124 based on the current number of knots/pairs $N_{CK}$, where a first external knot location is also defined at quantile level zero and a last external knot location is also defined at quantile level one. A first external knot associated with the first external knot location and a last external knot associated with the last external knot location are not included in the current number of knots $N_{CK}$. In an alternative embodiment, evenly spaced values for each explanatory variable value read from input dataset 124 are used to define the knot locations. When the "Fourier Basis" type of basis function is selected, evenly spaced values of the number of unique values of the explanatory variable X are used to define the pair locations based on the current number of knots/pairs $N_{CK}$.

In an operation 216, a current polynomial degree/period $N_{CD}$ is selected from the set of polynomial degree/periods $N_D$. For example, a first polynomial degree/period is selected from the set of polynomial degree/periods $N_D$.

In an operation 218, a basis function is fit to the pairs of the response variable value and either the quantile value computed for each explanatory variable value of each observation vector read from training dataset 124 or the value of each explanatory variable value of each observation vector read from training dataset 124 using the current number of knots/pairs $N_{CK}$ and the current polynomial degree/period $N_{CD}$ and based on the type of basis function indicated in operation 206. B-splines and p-splines are piecewise polynomials defined based on the current polynomial degree/period $N_{CD}$ and that are continuous at each internal knot location except when $N_{CD}$=0. A Fourier basis function generates periodic Fourier series expansions that are continuous at each internal pair location except when $N_{CD}$=0.

In an operation 220, a criterion fit value is computed for the fit basis function based on the fit criterion method selected in operation 212. Coefficients that describe the computed basis function may be saved in computer-readable medium 108 in association with the current number of knots/pairs $N_{CK}$ and the current polynomial degree/period $N_{CD}$.

In an operation 222, coefficients that describe the fit basis function and the computed criterion fit value may be stored in computer-readable medium 108 in association with the current number of knots/pairs $N_{CK}$ and the current polynomial degree/period $N_{CD}$.

In an operation 224, a determination is made concerning whether there is another polynomial degree/period of the set of polynomial degree/periods to evaluate. When there is another polynomial degree/period, processing continues in an operation 226. When there is not another polynomial degree/period, processing continues in an operation 228. For example, a polynomial degree/period counter may be used to index into the set of polynomial degree/periods, and a value of the polynomial degree/period counter may be used to indicate whether there is another polynomial degree/period of the set of polynomial degree/periods to evaluate.

In operation 226, a next polynomial degree/period is selected from the set of polynomial degree/periods $N_D$ as the current polynomial degree/period $N_{CD}$, and processing continues in operation 218 to fit the basis function using the next polynomial degree/period.

In operation 228, a determination is made concerning whether there is another number of knots/pairs of the set of knots/pairs $N_{IK}$ to evaluate. When there is another number of knots/pairs, processing continues in an operation 230. When there is not another number of knots/pairs, processing continues in an operation 232. For example, a number of knots/pairs counter may be used to index into the set of knots/pairs $N_{IK}$, and a value of the number of knots/pairs counter may be used to indicate whether there is another number of knots/pairs of the set of knots/pairs $N_{IK}$ to evaluate.

In operation 230, a next number of knots/pairs is selected from the set of knots/pairs $N_{IK}$ as the current number of knots/pairs $N_{CK}$, and processing continues in operation 214 to fit the basis function using the next number of knots/pairs with the set of polynomial degree/periods $N_D$.

In operation 232, a basis function having the best fit is determined from the stored criterion fit values. For example, a minimum criterion fit value may be identified from the stored criterion fit values, and the associated knot number $N_{BFK}$ and the associated polynomial degree/period $N_{BFD}$ may be selected with the associated coefficients to describe the best fit basis function. In alternative embodiments, a maximum criterion fit value may indicate the best fit basis function.

Figure 3B:
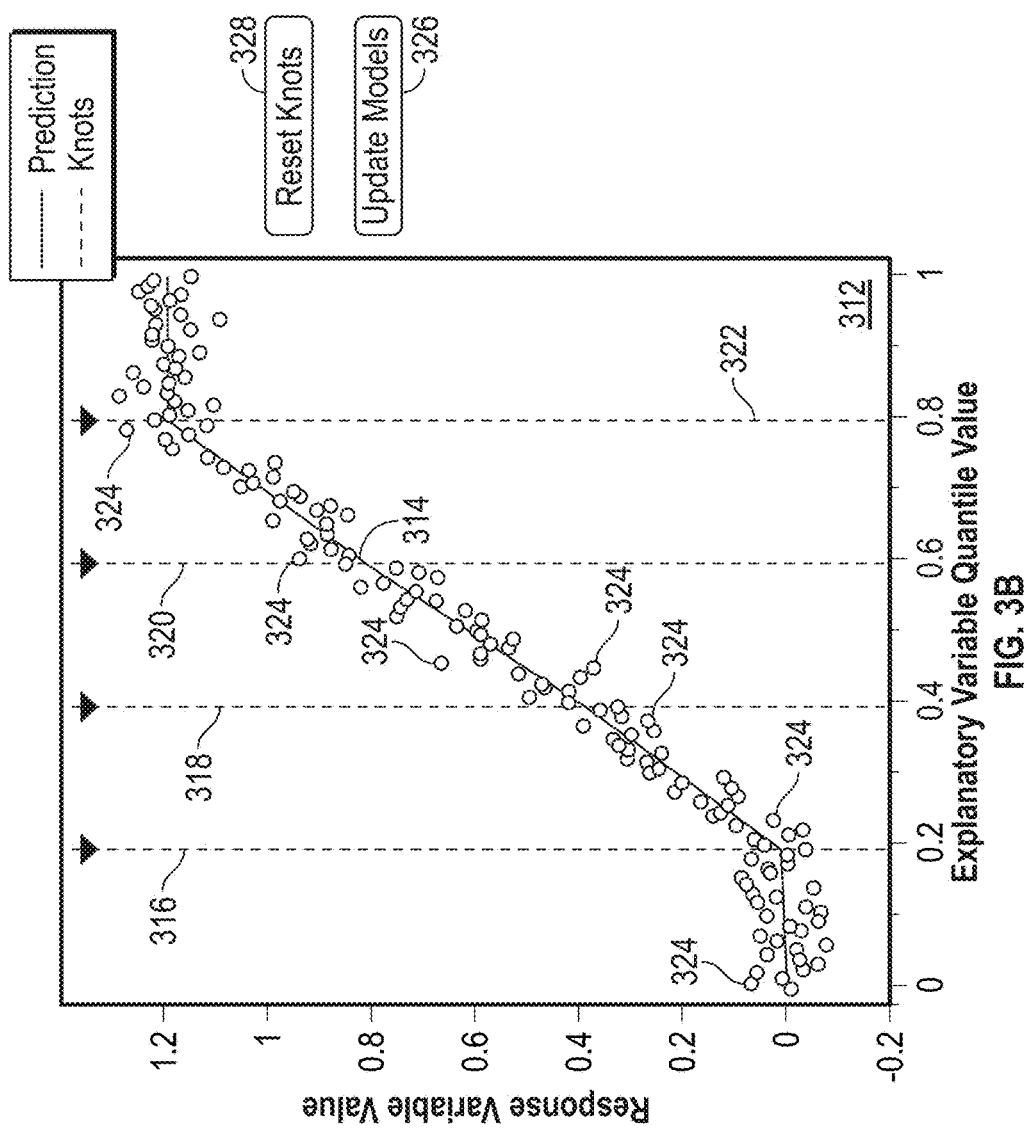

Referring to FIG. 2B, in an operation 234, a criterion fit graph is presented in display 116. For example, referring to FIG. 3A, a criterion fit graph 300 is presented in a user interface window of interactive basis function selection application 122 on display 116. An x-axis of criterion fit graph 300 is the number of internal knots though it could also present the number of pairs when Fourier basis is selected as the type of basis function. A y-axis of criterion fit graph 300 is the criterion fit value. Criterion fit graph 300 includes a curve defined for each polynomial degree/period of the set of polynomial degree/periods $N_D$. For example, for $N_D=\{0, 1, 2, 3\}$, a first curve 302 shows the criterion fit value as a function of the number of internal knots for $N_D$=0; a second curve 304 shows the criterion fit value as a function of the number of internal knots for $N_D$=1; a third curve 306 shows the criterion fit value as a function of the number of internal knots for $N_D$=2; a fourth curve 308 shows the criterion fit value as a function of the number of internal knots for $N_D$=3. Each curve of FIG. 3A may represent the number of pairs when Fourier basis is selected as the type of basis function. A number of internal knots line 310 indicates the number of internal knots of the basis function having the best fit though it could also present the number of pairs when Fourier basis is selected as the type of basis function. In the illustrative example presented in FIG. 3A, the basis function having the best fit is provided by $N_D$=1 as indicated by second curve 304 such that $N_{BFK}$=4 and $N_{BFD}$=1.

Referring again to FIG. 2B, in an operation 236, a best fit basis function graph is presented in display 116. For example, referring to FIG. 3B, a best fit basis function graph 312 is presented in the user interface window of interactive basis function selection application 122 on display 116. For illustration, criterion fit graph 300 and best fit basis function graph 312 may be presented simultaneously and side by side in the same user interface window. An x-axis of best fit basis function graph 312 is the explanatory variable quantile value. A y-axis of best fit basis function graph 312 is the response variable value. A best fit basis function curve 314 is a plot of the response variable value as a function of the explanatory variable quantile value, wherein the response variable value is computed using the coefficients that describe the best fit basis function.

Best fit basis function graph 312 includes a knot location line defined for each internal knot location determined at the evenly spaced quantiles of the explanatory variable values read from training dataset 124 based on the associated knot number $N_{BFK}$. In the illustrative example of best fit basis function graph 312, $N_{BFK}$=4, as shown by number of internal knots line 310. As a result, a first internal knot location line 316 shows a first quantile value at 0.2; a second internal knot location line 318 shows a second quantile value at 0.4; a third internal knot location line 320 shows a third quantile value at 0.6; and a fourth internal knot location line 322 shows a fourth quantile value at 0.8.

Best fit basis function graph 312 further includes scatter plot points 324 overlaid on best fit model curve 314. Scatter plot points 324 include a symbol for each pair of the response variable value and the quantile value computed for each explanatory variable value of each observation vector read from training dataset 124. Scatter plot points 324 provide a visual indication of the distribution of the data relative to the best fit basis function.

The user interface window further includes an update models button 326 and a reset knobs button 328 described below. For the Fourier basis function, reset knobs button 328 may be replaced with a reset pairs button. After presentation of criterion fit graph 300 and best fit basis function graph 312, a user may slide number of internal knots line 310 right or left, may slide internal knot location line 316, 318, 320, 322 (based on the number of internal knot locations) right or left, and/or may select update models button 326 or reset knobs button 328. As understood by a person of skill in the art, interactive basis function selection application 122 receives indicators of the user's interactions with the user interface window and responds based on the received indicator to update criterion fit graph 300 and best fit basis function graph 312.

Referring again to FIG. 2B, in an operation 238, a determination is made concerning whether the number of internal knots line 310 is slid right or left by the user to adjust the number of internal knots. When the number of internal knots is adjusted, processing continues in an operation 240. When the number of internal knots is not adjusted, processing continues in an operation 244. For example, interactive basis function selection application 122 receives an indicator of where the number of internal knots line 310 is dropped to define a new value for the current number of knots/pairs $N_{CK}$ based on the user interaction.

In operation 240, a basis function having the best fit based on the new value for the current number of knots/pairs $N_{CK}$ is determined from the stored criterion fit values. For example, a minimum criterion fit value may be identified from the stored criterion fit values based on the new value for the current number of knots/pairs $N_{CK}$, and the polynomial degree/period $N_{BFD}$ may be selected with the coefficients associated with the best fit basis function having the current number of knots/pairs $N_{CK}$.

Figure 4A:
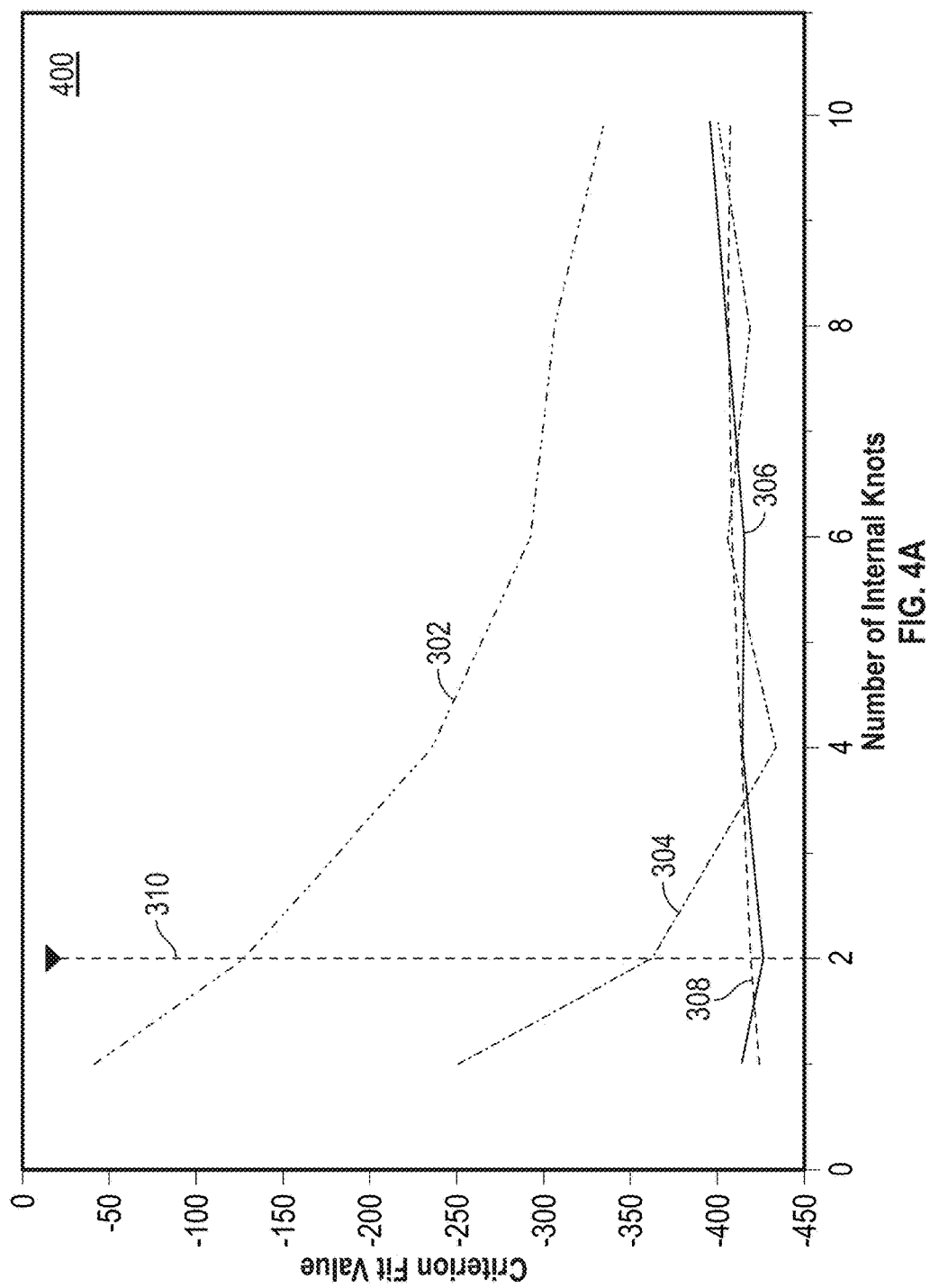
Figure 4B:
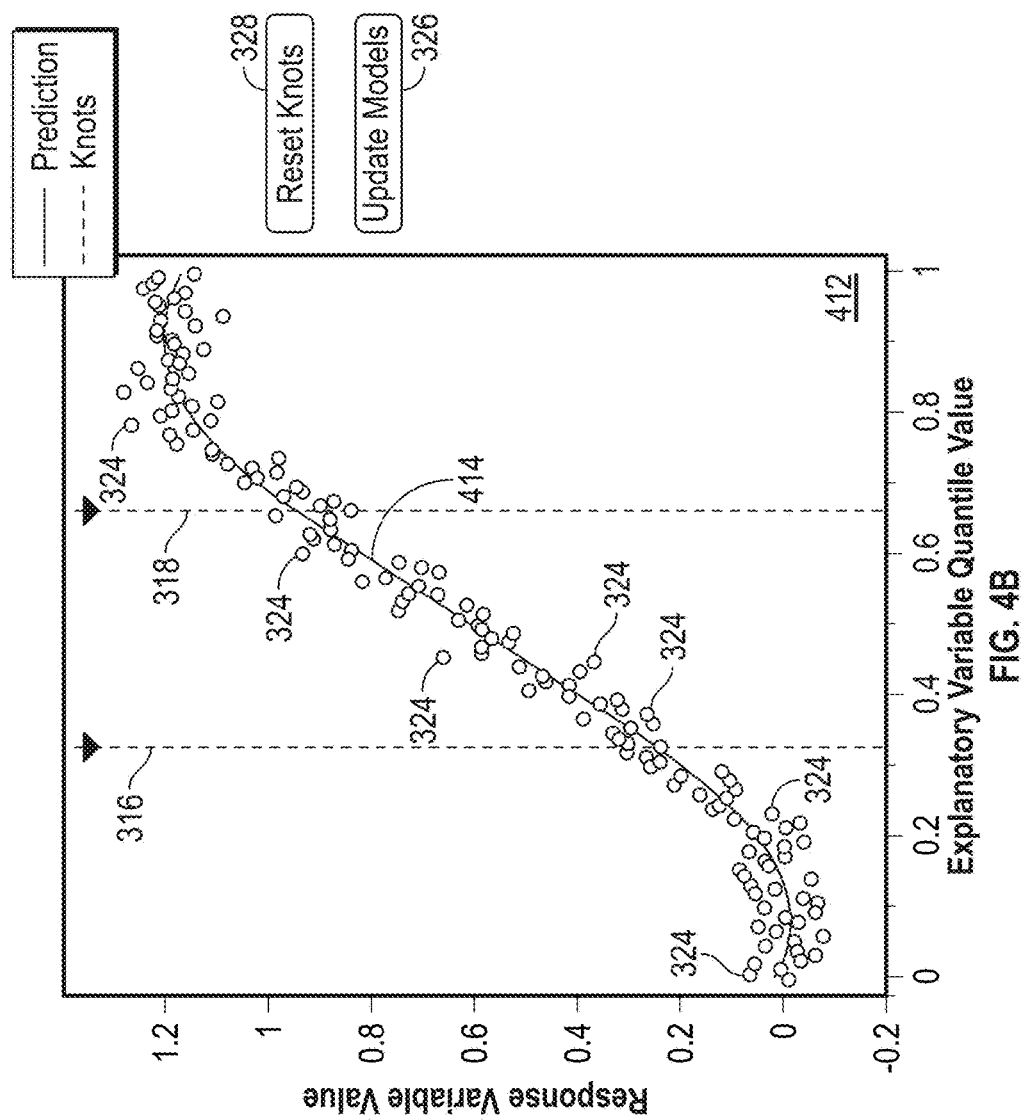

In an operation 242, a criterion fit graph associated with the new value for the current number of knots/pairs $N_{CK}$ is presented in display 116. For example, referring to FIG. 4A, a second criterion fit graph 400 is presented in the user interface window of interactive basis function selection application 122 on display 116. Second criterion fit graph 400 is identical to criterion fit graph 300 except that number of internal knots line 310 has been moved to indicate the new value for the current number of knots/pairs $N_{CK}$=2. The basis function having the best fit is provided by $N_{BFD}$=2 as indicated by third curve 306. Processing continues in operation 236 to update the best fit basis function graph presented in display 116. For example, referring to FIG. 4B, a second best fit basis function graph 412 is presented in the user interface window of interactive basis function selection application 122 on display 116 in response to $N_{CK}$=2. A second best fit model curve 414 is a plot of the response variable value as a function of the explanatory variable quantile value using $N_{CK}$=2, the associated polynomial degree/period $N_{BFD}$=2, and the associated coefficients that describe the basis function for $N_{CK}$=2 and $N_{BFD}$=2.

Second best fit basis function graph 412 includes a knot location line or a pair location line defined for each internal knot location or pair location determined at the evenly spaced quantiles of the explanatory variable values read from training dataset 124 based on $N_{CK}$=2. As a result, first internal knot location line 316 shows a first quantile value at 0.33, and second internal knot location line 318 shows a second quantile value at 0.66.

In operation 244, a determination is made concerning whether update models button 326 is selected by the user to update the basis functions based on one or more new locations of the internal knots/pairs. When update models button 326 is selected, processing continues in an operation 246. When update models button 326 is not selected, processing continues in an operation 262. For example, interactive basis function selection application 122 receives an indicator that the user has selected update models button 326.

Figure 5B:
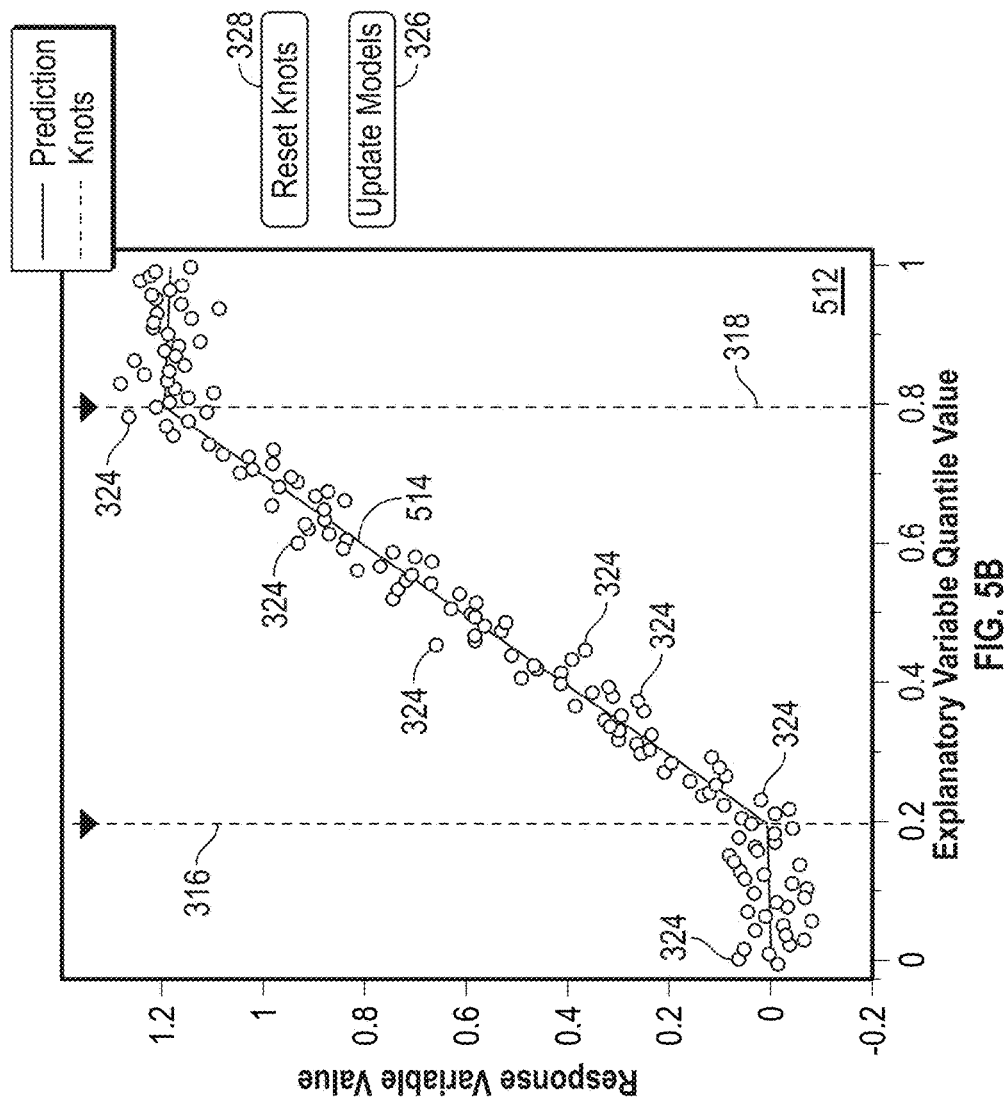

In operation 246, the one or more new locations of the internal knots/pairs is determined. For example, interactive basis function selection application 122 receives an indicator of a new quantile value location for first internal knot location line 316 and/or for second internal knot location line 318 to define the one or more new locations of the internal knots/pairs for the current number of knots/pairs $N_{CK}$. For example, referring to FIG. 5B, a third best fit basis function graph 512 is presented in the user interface window of interactive basis function selection application 122 on display 116 in response to moving first internal knot location line 316 to the first quantile value at 0.2 and second internal knot location line 318 to the second quantile value at 0.8.

In an operation 248, a current polynomial degree/period $N_{CD}$ is selected from the set of polynomial degree/periods $N_D$. For example, a first polynomial degree/period is selected from the set of polynomial degree/periods $N_D$.

In an operation 250, a basis function is fit to the response variable value and the quantile value computed for each explanatory variable value of each observation vector read from training dataset 124 using the current number of knots/pairs $N_{CK}$ and the current polynomial degree/period $N_{CD}$ and based on the type of basis function indicated in operation 206. The internal knot locations are the one or more new locations of the internal knots/pairs for the current number of knots/pairs $N_{CK}$, the first external knot location at quantile level zero, and the last external knot location at quantile level one.

In an operation 252, a criterion fit value is computed for the computed basis function based on the fit criterion method selected in operation 212. Coefficients that describe the computed basis function may be saved in computer-readable medium 108 in association with the current number of knots/pairs $N_{CK}$ and the current polynomial degree/period $N_{CD}$.

In an operation 254, coefficients that describe the computed basis function and the computed criterion fit value may be stored in computer-readable medium 108 in association with the current number of knots/pairs $N_{CK}$ and the current polynomial degree/period $N_{CD}$ and the one or more new locations of the internal knots/pairs.

In an operation 256, a determination is made concerning whether there is another polynomial degree/period of the set of polynomial degree/periods to evaluate. When there is another polynomial degree/period, processing continues in an operation 258. When there is not another polynomial degree/period, processing continues in an operation 260.

In operation 258, a next polynomial degree/period is selected from the set of polynomial degree/periods $N_D$ as the current polynomial degree/period $N_{CD}$, and processing continues in operation 250 to fit the basis function using the next polynomial degree/period.

In operation 260, the basis function having the best fit is determined from the stored criterion fit values. For example, a minimum criterion fit value may be identified from the stored criterion fit values for the current number of knots/pairs $N_{CK}$ with the one or more new locations of the internal knots/pairs, and the polynomial degree/period $N_{BFD}$ may be selected with the coefficients associated with the best fit basis function. Processing continues in operation 234 to update the criterion fit graph and the best fit basis function graph presented in display 116. For example, referring to FIG. 5A, a third criterion fit graph 500 is presented in the user interface window of interactive basis function selection application 122 on display 116. Third criterion fit graph 500 includes a curve defined for each polynomial degree/period of the set of polynomial degree/periods $N_D$ computed in operations 250 and 252 with the one or more new locations of the internal knots/pairs for the current number of knots/pairs $N_{CK}$. For example, for $N_D=\{0, 1, 2, 3\}$, a fifth curve 502 shows the criterion fit value as a function of the number of internal knots for $N_D=0$; a sixth curve 604 shows the criterion fit value as a function of the number of internal knots for $N_D=1$; a seventh curve 506 shows the criterion fit value as a function of the number of internal knots for $N_D=2$; an eighth curve 508 shows the criterion fit value as a function of the number of internal knots for $N_D=3$. The basis function having the best fit is provided by $N_D=1$ as indicated by sixth curve 604. Only the points of each curve 502, 504, 506, 508 computed for $N_{CK}=2$ have been updated because they are the only values that have changed. Processing continues in operation 236 to also update the best fit basis function graph presented in display 116. For example, referring again to FIG. 5B, a third best fit model curve 514 is a plot of the response variable value as a function of the explanatory variable quantile value using the one or more new locations of the internal knots/pairs for the current number of knots/pairs $N_{CK}$, the best fit polynomial degree/period $N_D=1$, and the coefficients that describe the best fit basis function for $N_{CK}=2$ and $N_D=1$.

Referring to FIG. 2C, in operation 262, a determination is made concerning whether reset knots/pairs button 328 is selected by the user to reset the basis functions based on the evenly spaced quantiles determined based on the current number of knots/pairs $N_{CK}$. When reset knots/pairs button 328 is selected, processing continues in an operation 264. When reset knots/pairs button 328 is not selected, processing continues in an operation 266. For example, interactive basis function selection application 122 receives an indicator that the user has selected reset knots/pairs button 328.

In operation 264, the evenly spaced quantile knot location(s) are determined based on the current number of knots/pairs $N_{CK}$, and processing continues in operation 248 to update the basis functions and the associated graphs.

In operation 266, a determination is made concerning whether the user has indicated to store the current best fit basis function to basis function description 126. When the user has indicated to store the current best fit basis function, processing continues in an operation 268. When the user has not indicated to store the current best fit basis function, processing continues in operation 238 to determine a response to a next user interaction with interactive basis function selection application 122. For example, interactive basis function selection application 122 receives an indicator that the user has selected a save or store button or menu item.

In operation 268, the coefficients for the current best fit basis function, the current number of knots/pairs $N_{CK}$, $N_{BFD}$, and the one or more current locations of the internal knots/pairs are written to and stored in model description 126, and processing is stopped. An error value and/or a residual value may be computed between results generated using the current best fit basis function and the values read from training dataset 124. The computed error value and/or a residual value also may be written to and stored in model description 126. A log-likelihood for computing the AIC, the BIC, etc. also may be stored.

Interactive basis function selection application 122 allows the user to interactively adjust the number of internal knots/pairs and their locations to interactively determine a best fit basis function that is otherwise difficult to identify through adaptive procedures or is difficult to quickly identify due to the very large set of parameters needed to evaluate that makes the determination computationally very expensive. The process is automatically initiated to provide the user with an initial evaluation based on evenly spaced quantile locations for the internal knot locations. After adjusting the number of knots/pairs and/or their locations, the user receives immediate feedback on the result of their selection. Additionally, the overlay of the data points assists the user in visually identifying potentially better knot locations. As a result, interactive basis function selection application 122 allows the user to control the process by which the best model is defined and to use their expertise in selecting knot locations with fast updating and determination of a best polynomial degree/period for a selected number of knots/pairs and knot locations.

As stated previously, interactive basis function selection application 122 is easy to use and provides approximately instantaneous feedback so that the user can quickly and efficiently change a location of one or more knots/pairs interactively. Alternative solutions require the user to specify the exact locations of all knots/pairs, while Interactive basis function selection application 122 allows the user to easily change all or any subset of the default locations as needed.

Figure 6:
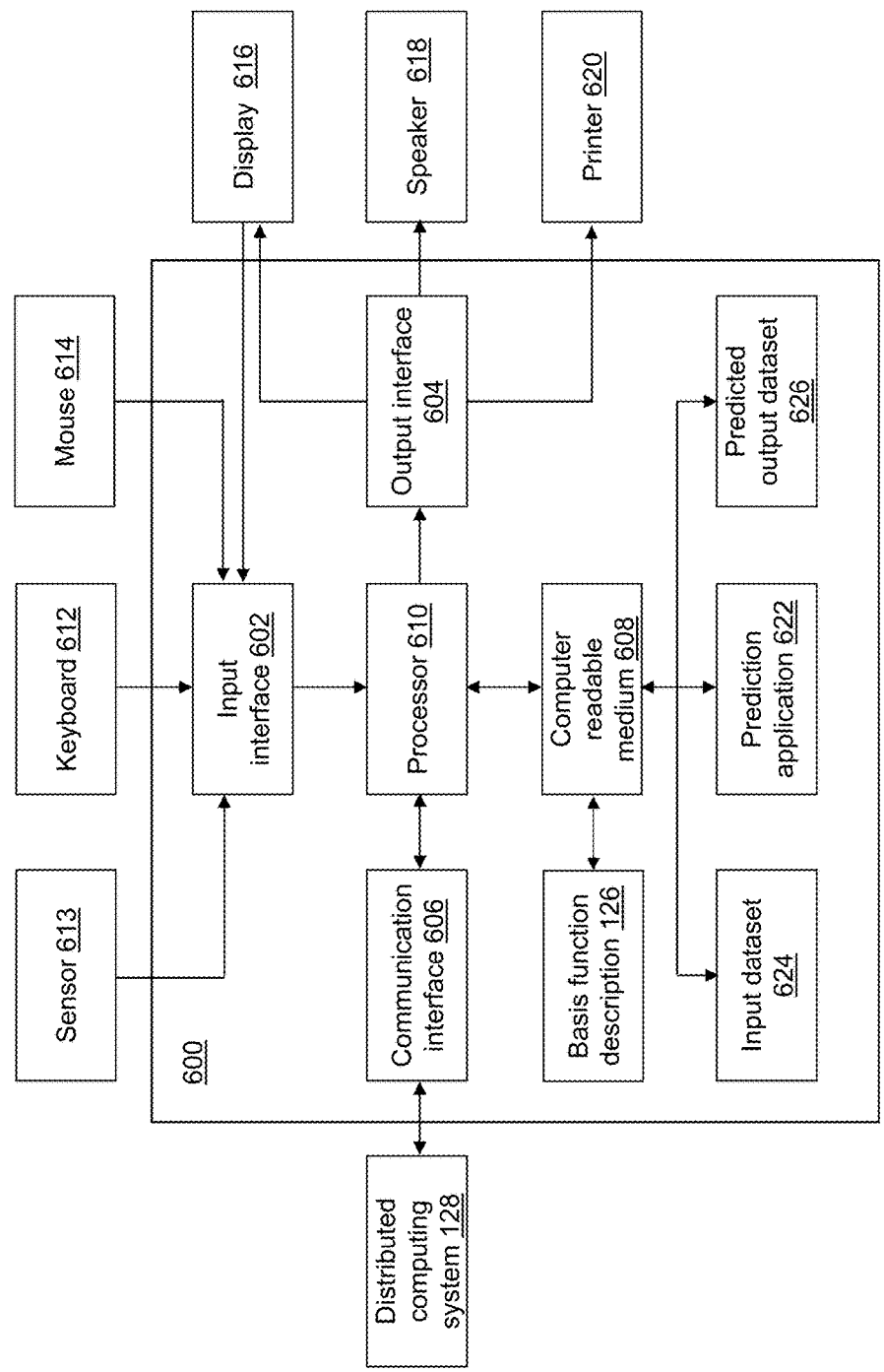
FIG. 6 depicts a block diagram of a prediction device that uses the selected basis function to predict a result in accordance with an illustrative embodiment.

Referring to FIG. 6, a block diagram of a prediction device 600 is shown in accordance with an illustrative embodiment. Prediction device 600 may include a second input interface 602, a second output interface 604, a second communication interface 606, a second non-transitory computer-readable medium 608, a second processor 610, a prediction application 622, basis function description 126, an input dataset 624, and predicted output dataset 626. Fewer, different, and/or additional components may be incorporated into prediction device 600. Prediction device 600 and basis function selection device 100 may be the same or different devices.

Second input interface 602 provides the same or similar functionality as that described with reference to input interface 102 of basis function selection device 100 though referring to prediction device 600. Second output interface 604 provides the same or similar functionality as that described with reference to output interface 104 of basis function selection device 100 though referring to prediction device 600. Second communication interface 606 provides the same or similar functionality as that described with reference to communication interface 106 of basis function selection device 100 though referring to prediction device 600. Data and messages may be transferred between prediction device 600 and distributed computing system 128 using second communication interface 606. Second computer-readable medium 608 provides the same or similar functionality as that described with reference to computer-readable medium 108 of basis function selection device 100 though referring to prediction device 600. Second processor 610 provides the same or similar functionality as that described with reference to processor 110 of basis function selection device 100 though referring to prediction device 600.

Prediction application 622 performs operations associated with predicting values for response variable Y using basis function description 126 based on values for the explanatory variable X stored in input dataset 624. Dependent on the type of data stored in training dataset 124 and input dataset 624, prediction application 622 may identify anomalies as part of process control, for example, of a manufacturing process, for machine condition monitoring, for example, an electro-cardiogram device, etc. Some or all of the operations described herein may be embodied in prediction application 622. The operations may be implemented using hardware, firmware, software, or any combination of these methods.

Figure 7:
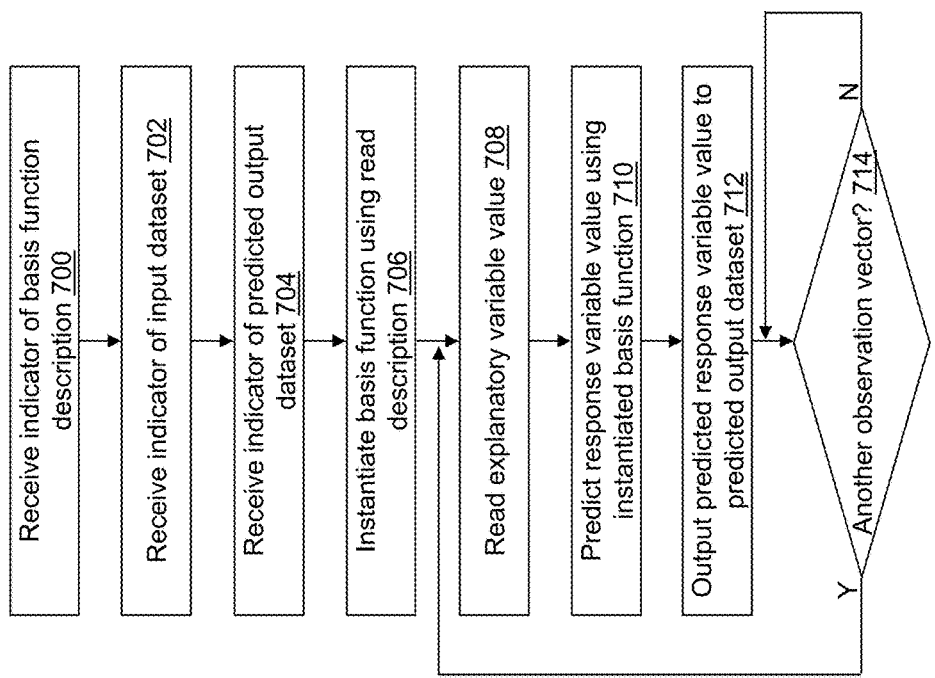
FIG. 7 depicts a flow diagram illustrating examples of operations performed by the prediction device of FIG. 6 in accordance with an illustrative embodiment.

Referring to the example embodiment of FIG. 7, prediction application 622 is implemented in software (comprised of computer-readable and/or computer-executable instructions) stored in second computer-readable medium 608 and accessible by second processor 610 for execution of the instructions that embody the operations of prediction application 622. Prediction application 622 may be written using one or more programming languages, assembly languages, scripting languages, etc. Prediction application 622 may be integrated with other analytic tools. For example, prediction application 622 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 622 further may be performed by an ESPE. Prediction application 622 and interactive basis function selection application 122 further may be integrated applications.

Prediction application 622 may be implemented as a Web application. Prediction application 622 may be integrated with other system processing tools to automatically process data generated as part of operation of an enterprise using second input interface 602, second output interface 604, and/or second communication interface 606 so that appropriate action can be initiated in response. For example, a warning or an alert may be presented using a second display 616, a second speaker 618, a second printer 620, etc. or sent to one or more computer-readable media, display, speaker, printer, etc. of distributed computing system 128 based on predicted values for response variable Y.

Training dataset 124 and input dataset 624 may be generated, stored, and accessed using the same or different mechanisms. Similar to training dataset 124, input dataset 624 may include a plurality of rows and a plurality of columns with the plurality of rows referred to as observation vectors or records, and the columns referred to as variables that are associated with an observation. Input dataset 624 may be transposed.

Similar to training dataset 124, input dataset 624 may be stored on second computer-readable medium 608 or on one or more computer-readable media of distributed computing system 128 and accessed by prediction device 600 using second communication interface 606. Data stored in input dataset 624 may be a sensor measurement or a data communication value, for example, from a sensor 613, may be generated or captured in response to occurrence of an event or a transaction, generated by a device such as in response to an interaction by a user with the device, for example, from a second keyboard 612 or a second mouse 614, etc. The data stored in input dataset 624 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 624 may be captured at different time points periodically, intermittently, when an event occurs, etc. One or more columns may include a time value. Similar to training dataset 124, data stored in input dataset 624 may be generated as part of the IoT, and some or all data may be pre- or post-processed by an ESPE.

Similar to training dataset 124, input dataset 624 may be stored in various compressed formats such as a coordinate format, a compressed sparse column format, a compressed sparse row format, etc. Input dataset 624 further may be stored using various structures as known to those skilled in the art including a file system, a relational database, a system of tables, a structured query language database, etc. on basis function selection device 100, on prediction device 600, and/or on distributed computing system 128. Prediction device 600 and/or distributed computing system 128 may coordinate access to input dataset 624 that is distributed across a plurality of computing devices. For example, input dataset 624 may be stored in a cube distributed across a grid of computers as understood by a person of skill in the art. As another example, input dataset 624 may be stored in a multi-node Hadoop® cluster. As another example, input dataset 624 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 624.

Referring to FIG. 7, example operations of prediction application 622 are described. Additional, fewer, or different operations may be performed depending on the embodiment of prediction application 622. The order of presentation of the operations of FIG. 7 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 700, an eighth indicator may be received that indicates basis function description 126. For example, the eighth indicator indicates a location and a name of basis function description 126. As an example, the eighth indicator may be received by prediction application 622 after selection from a user interface window or after entry by a user into a user interface window. In an alternative embodiment, basis function description 126 may not be selectable. For example, a most recently created basis function description may be used automatically.

In an operation 702, a ninth indicator may be received that indicates input dataset 624. For example, the ninth indicator indicates a location and a name of input dataset 624. As an example, the ninth indicator may be received by prediction application 622 after selection from a user interface window or after entry by a user into a user interface window. In an alternative embodiment, input dataset 624 may not be selectable. For example, a most recently created dataset may be used automatically.

In an operation 704, a tenth indicator may be received that indicates predicted output dataset 626. For example, the tenth indicator indicates a location and a name of predicted output dataset 626. As an example, the tenth indicator may be received by prediction application 622 after selection from a user interface window or after entry by a user into a user interface window. In an alternative embodiment, predicted output dataset 626 may not be selectable. For example, a default name and location for predicted output dataset 626 may be used automatically.

In an operation 706, a basis function is instantiated based on the basis function description read from basis function description 126. For example, the coefficients for the polynomial defined by the selected polynomial degree/period or the selected Fourier series period using the selected number of knots/pairs and their locations is instantiated.

In an operation 708, a value x for the explanatory variable X is read from a next line of input dataset 624 or optionally is received from an ESPE.

In an operation 710, a value y for the response variable Y is predicted using the instantiated basis function and the read value x.

In an operation 712, the predicted value y for the response variable Y is output to predicted output dataset 626. The value x and/or other values read from input dataset further may be output to predicted output dataset 626.

In an operation 714, a determination is made concerning whether there is another observation vector to process. When there is another observation vector to process, processing continues in operation 708. When there is not another observation vector to process, processing continues in operation 714 to wait for receipt of another observation vector, for example, from an ESPE, or processing is done.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
  read a dataset that includes a plurality of observation vectors, wherein each observation vector of the plurality of observation vectors includes an explanatory variable value of an explanatory variable and a response variable value of a response variable;
  define a first location value and a last location value;
  (a) select a number of locations value from a predefined plurality of number of locations values;
  (b) define a location value for each integer value between one and the selected number of locations value, wherein the location value is defined based on each explanatory variable value of the explanatory variable read from the dataset;
  (c) select a parameter value from a predefined plurality of parameter values;
  (d) fit a basis function using the defined first location value, each defined location value, the defined last location value, and the selected parameter value, wherein the basis function is fit to the explanatory variable value and the response variable value of each observation vector of the plurality of observation vectors to define coefficients that describe the response variable based on the explanatory variable;
  (e) compute a fit criterion value for the fit basis function that quantifies a goodness of the fit; and
  (f) store the computed fit criterion value, each defined location value, the selected parameter value, and the defined coefficients to the computer-readable medium;
  (g) repeat (c) to (f) with each remaining parameter value of the predefined plurality of parameter values as the selected parameter value;
  (h) repeat (a) to (g) with each remaining number of locations value of the predefined plurality of number of locations values as the selected number of locations value;
  (i) determine a best fit basis function based on the stored, computed fit criterion value of each fit basis function;
  (j) present a criterion fit graph on a display, wherein the criterion fit graph includes a curve for each parameter value of the predefined plurality of parameter values, wherein each curve shows the stored, computed fit criterion value as a function of the predefined plurality of number of locations values;
  (k) present a best fit graph on the display next to the presented criterion fit graph, wherein the best fit graph includes a plurality of location lines, wherein a location line is defined at each location defined in (b) for the determined best fit basis function, and a best fit function curve that is a plot of the response variable value computed as a function of the explanatory variable value using the defined coefficients of the determined best fit basis function;

receive an indicator that a first location line of the plurality of location lines is moved to a different location value; and repeat (a) to (k) replacing the location value associated with the first location line with the different location value to update the presented criterion fit graph and the presented best fit graph.

2. The non-transitory computer-readable medium of claim 1, wherein the fit criterion value is computed for the fit basis function using a predefined fit criterion method.

3. The non-transitory computer-readable medium of claim 2, wherein the fit criterion method is predefined as a user input through a user interface.

4. The non-transitory computer-readable medium of claim 3, wherein the predefined fit criterion method is selected from the group consisting of a Bayesian information criterion method, an Akaike information criterion method, a generalized cross-validation information criterion method, a robust generalized cross-validation information criterion method, and a corrected Akaike information criterion method.

5. The non-transitory computer-readable medium of claim 1, wherein the number of locations value is a number of knots of a b-spline basis function or of a p-spline basis function.

6. The non-transitory computer-readable medium of claim 1, wherein the number of locations value is a number of cosine-sine pairs of a Fourier basis function.

7. The non-transitory computer-readable medium of claim 1, wherein the parameter value is a polynomial degree number of a b-spline basis function or of a p-spline basis function.

8. The non-transitory computer-readable medium of claim 1, wherein the parameter value is a period of a Fourier basis function.

9. The non-transitory computer-readable medium of claim 1, wherein each location value is defined as an evenly spaced quantile value based on the selected number of locations value.

10. The non-transitory computer-readable medium of claim 9, wherein a first location value is zero and a last location value is one.

11. The non-transitory computer-readable medium of claim 1, wherein each location value is defined as an evenly spaced value between a minimum value of the explanatory variable values and a maximum value of the explanatory variable values based on the selected number of locations value.

12. The non-transitory computer-readable medium of claim 1, wherein the explanatory variable value is a quantile value computed for each explanatory variable value, wherein the quantile value is computed for each explanatory variable value before (b).

13. The non-transitory computer-readable medium of claim 1, wherein the best fit basis function graph further includes a scatterplot of the response variable value as a function of the explanatory variable value read from the dataset.

14. The non-transitory computer-readable medium of claim 1, wherein the computer-readable instructions further cause the computing device to:
read a second explanatory variable value from a scoring dataset;
compute a new response variable value using the stored, defined coefficients; and
output the computed new response variable value.

15. The non-transitory computer-readable medium of claim 1, wherein the basis function is selected from the group consisting of a b-splines basis function, a p-splines basis function, a power basis function, a Fourier basis function, a wavelets function, and an exponential basis function.

16. A computing device comprising:
a processor; and
a non-transitory computer-readable medium operably coupled to the processor, the computer-readable medium having computer-readable instructions stored thereon that, when executed by the processor, cause the computing device to
read a dataset that includes a plurality of observation vectors, wherein each observation vector of the plurality of observation vectors includes an explanatory variable value of an explanatory variable and a response variable value of a response variable;
define a first location value and a last location value;
(a) select a number of locations value from a predefined plurality of number of locations values;
(b) define a location value for each integer value between one and the selected number of locations value, wherein the location value is defined based on each explanatory variable value of the explanatory variable read from the dataset;
(c) select a parameter value from a predefined plurality of parameter values;
(d) fit a basis function using the defined first location value, each defined location value, the defined last location value, and the selected parameter value, wherein the basis function is fit to the explanatory variable value and the response variable value of each observation vector of the plurality of observation vectors to define coefficients that describe the response variable based on the explanatory variable;
(e) compute a fit criterion value for the fit basis function that quantifies a goodness of the fit; and
(f) store the computed fit criterion value, each defined location value, the selected parameter value, and the defined coefficients to the computer-readable medium;
(g) repeat (c) to (f) with each remaining parameter value of the predefined plurality of parameter values as the selected parameter value;
(h) repeat (a) to (g) with each remaining number of locations value of the predefined plurality of number of locations values as the selected number of locations value;
(i) determine a best fit basis function based on the stored, computed fit criterion value of each fit basis function;
(j) present a criterion fit graph on a display, wherein the criterion fit graph includes a curve for each parameter value of the predefined plurality of parameter values, wherein each curve shows the stored, computed fit criterion value as a function of the predefined plurality of number of locations values;
(k) present a best fit graph on the display next to the presented criterion fit graph, wherein the best fit graph includes a plurality of location lines, wherein a location line is defined at each location defined in (b) for the determined best fit basis function, and a best fit function curve that is a plot of the response variable value computed as a function of the explanatory variable value using the defined coefficients of the determined best fit basis function;

receive an indicator that a first location line of the plurality of location lines is moved to a different location value; and repeat (a) to (k) replacing the location value associated with the first location line with the different location value to update the presented criterion fit graph and the presented best fit graph.

17. A method of providing interactive basis function selection, the method comprising:

reading, by a computing device, a dataset that includes a plurality of observation vectors, wherein each observation vector of the plurality of observation vectors includes an explanatory variable value of an explanatory variable and a response variable value of a response variable;

defining, by the computing device, a first location value and a last location value;

(a) selecting, by the computing device, a number of locations value from a predefined plurality of number of locations values;

(b) defining, by the computing device, a location value for each integer value between one and the selected number of locations value, wherein the location value is defined based on each explanatory variable value of the explanatory variable read from the dataset;

(c) selecting, by the computing device, a parameter value from a predefined plurality of parameter values;

(d) fitting, by the computing device, a basis function using the defined first location value, each defined location value, the defined last location value, and the selected parameter value, wherein the basis function is fit to the explanatory variable value and the response variable value of each observation vector of the plurality of observation vectors to define coefficients that describe the response variable based on the explanatory variable;

(e) computing, by the computing device, a fit criterion value for the fit basis function that quantifies a goodness of the fit; and (f) storing, by the computing device, the computed fit criterion value, each defined location value, the selected parameter value, and the defined coefficients to the computer-readable medium;

(g) repeating, by the computing device, (c) to (f) with each remaining parameter value of the predefined plurality of parameter values as the selected parameter value;

(h) repeating, by the computing device, (a) to (g) with each remaining number of locations value of the predefined plurality of number of locations values as the selected number of locations value;

(i) determining, by the computing device, a best fit basis function based on the stored, computed fit criterion value of each fit basis function;

(j) presenting, by the computing device, a criterion fit graph on a display, wherein the criterion fit graph includes a curve for each parameter value of the predefined plurality of parameter values, wherein each curve shows the stored, computed fit criterion value as a function of the predefined plurality of number of locations values;

(k) presenting, by the computing device, a best fit graph on the display next to the presented criterion fit graph, wherein the best fit graph includes a plurality of location lines, wherein a location line is defined at each location defined in (b) for the determined best fit basis function, and a best fit function curve that is a plot of the response variable value computed as a function of the explanatory variable value using the defined coefficients of the determined best fit basis function;

receiving, by the computing device, an indicator that a first location line of the plurality of location lines is moved to a different location value; and repeating, by the computing device, (a) to (k) replacing the location value associated with the first location line with the different location value to update the presented criterion fit graph and the presented best fit graph.

18. The method of claim 17, wherein the fit criterion value is computed for the fit basis function using a predefined fit criterion method.

19. The method of claim 18, wherein the fit criterion method is predefined as a user input through a user interface.

20. The method of claim 19, wherein the predefined fit criterion method is selected from the group consisting of a Bayesian information criterion method, an Akaike information criterion method, a generalized cross-validation information criterion method, a robust generalized cross-validation information criterion method, and a corrected Akaike information criterion method.

21. The method of claim 17, wherein the number of locations value is a number of knots of a b-spline basis function, of a p-spline basis function, or of a power basis function.

22. The method of claim 17, wherein the number of locations value is a number of cosine-sine pairs of a Fourier basis function.

23. The method of claim 17, wherein the parameter value is a polynomial degree number of a b-spline basis function, of a p-spline basis function, or of a power basis function.

24. The method of claim 17, wherein the parameter value is a period of a Fourier basis function.

25. The method of claim 17, wherein each location value is defined as an evenly spaced quantile value based on the selected number of locations value.

26. The method of claim 25, wherein a first location value is zero and a last location value is one.

27. The method of claim 17, wherein each location value is defined as an evenly spaced value between a minimum value of the explanatory variable values and a maximum value of the explanatory variable values based on the selected number of locations value.

28. The method of claim 17, wherein the explanatory variable value is a quantile value computed for each explanatory variable value, wherein the quantile value is computed for each explanatory variable value before (b).

29. The method of claim 17, wherein the best fit basis function graph further includes a scatterplot of the response variable value as a function of the explanatory variable value read from the dataset.

30. The method of claim 17, further comprising:

reading, by the computing device, a second explanatory variable value from a scoring dataset;

computing, by the computing device, a new response variable value using the stored, defined coefficients; and outputting, by the computing device, the computed new response variable value.

* * * * *

UNITED STATES PATENT AND TRADEMARK OFFICE
CERTIFICATE OF CORRECTION

PATENT NO. : 10,062,190 B1
APPLICATION NO. : 15/978568
DATED : August 28, 2018
INVENTOR(S) : Ryan Jeremy Parker Page 1 of 1

It is certified that error appears in the above-identified patent and that said Letters Patent is hereby corrected as shown below:

In the Specification

Column 13, Lines 30-32:
Delete the sentence "The user interface window further includes an update models button 326 and a reset knobs button 328 described below." and replace with --The user interface window further includes an update models button 326 and a reset knots button 328 described below.--

Column 13, Lines 32-33:
Delete the sentence "For the Fourier basis function, reset knobs button 328 may be replaced with a reset pairs button." and replace with --For the Fourier basis function, reset knots button 328 may be replaced with a reset pairs button.--

Column 13, Lines 38-39:
Delete the phrase "and/or may select update models button 326 or reset knobs button 328" and replace with --and/or may select update models button 326 or reset knots button 328--

Signed and Sealed this
Eleventh Day of December, 2018

Andrei Iancu
*Director of the United States Patent and Trademark Office*